(12) United States Patent
Tazume

(10) Patent No.: US 12,327,215 B2
(45) Date of Patent: Jun. 10, 2025

(54) LOGISTICS MANAGEMENT SERVER, INFORMATION PROCESSING METHOD, AND INFORMATION PROCESSING SYSTEM

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 34 days.

(21) Appl. No.: 18/307,065

(22) Filed: Apr. 26, 2023

(65) Prior Publication Data
US 2023/0351313 A1  Nov. 2, 2023

(30) Foreign Application Priority Data
Apr. 28, 2022 (JP) ................... 2022-074628

(51) Int. Cl.
| | | |
|---|---|---|
| *G06Q 10/0833* | (2023.01) | |
| *G05D 1/00* | (2006.01) | |
| *G06Q 10/0832* | (2023.01) | |
| *G08B 3/10* | (2006.01) | |

(52) U.S. Cl.
CPC ....... *G06Q 10/0833* (2013.01); *G05D 1/0287* (2013.01); *G06Q 10/0832* (2013.01); *G08B 3/10* (2013.01)

(58) Field of Classification Search
CPC ............ G06Q 10/083; G06Q 10/0832; G06Q 10/0833; G06Q 10/0853; G06Q 10/0837; G06Q 10/0838
See application file for complete search history.

(56) References Cited

U.S. PATENT DOCUMENTS

| | | | |
|---|---|---|---|
| 2018/0281657 A1* | 10/2018 | Healey | ................... G06Q 30/06 |
| 2019/0268743 A1* | 8/2019 | Cho | ....................... B60Q 1/545 |
| 2020/0097890 A1 | 3/2020 | Migita | |

FOREIGN PATENT DOCUMENTS

WO   2018216502 A1   11/2018

OTHER PUBLICATIONS

"Sounds of the Self-Driving Car." Waymo, Dec. 13, 2016, waymo.com/blog/2016/12/sounds-of-self-driving-car. (Year: 2016).*

* cited by examiner

*Primary Examiner* — Emmett K. Walsh
(74) *Attorney, Agent, or Firm* — Sughrue Mion, PLLC

(57) ABSTRACT

A logistics management server includes circuitry. The circuitry is configured to acquire route plans for unmanned vehicles each delivering a package to a delivery point. The circuitry is further configured to determine whether a first unmanned vehicle and a second unmanned vehicle will approach each other based on the acquired route plan for the first unmanned vehicle and the acquired route plan for the second unmanned vehicle, and when determining that the first unmanned vehicle and the second unmanned vehicle will approach each other, set sound identification information such that a sound output from the first unmanned vehicle and a sound output from the second unmanned vehicle each have a different characteristic.

11 Claims, 8 Drawing Sheets

Fig.3

| Delivery Number | User ID | Delivery Address | Delivery Date | Sound Identification Information | Box Number | Notification Destination | Delivery Status |
|---|---|---|---|---|---|---|---|
| **** | **** | **** | **** | 1 | 1 | **** | Delivery Completed |
| **** | **** | **** | **** | 1 | 4 | **** | In Transit |
| **** | **** | **** | **** | 1 | 2 | **** | Not Yet Delivered |
| ⋮ | ⋮ | ⋮ | ⋮ | ⋮ | ⋮ | ⋮ | ⋮ |

Fig.4

| Sound Identification Information | Content Identification Information |
|---|---|
| 1 | 01: I am turning left. |
| | 02: I am turning right. |
| | 03: I am about to stop. |
| | 04: I am about to start. |
| | 05: The delivery box is number 1. |
| | ⋮ |
| 2 | 01: I am turning left. |
| | 02: I am turning right. |
| | 03: I am about to stop. |
| | 04: I am about to start. |
| | 05: The delivery box is number 1. |
| | ⋮ |
| 3 | ⋮ |

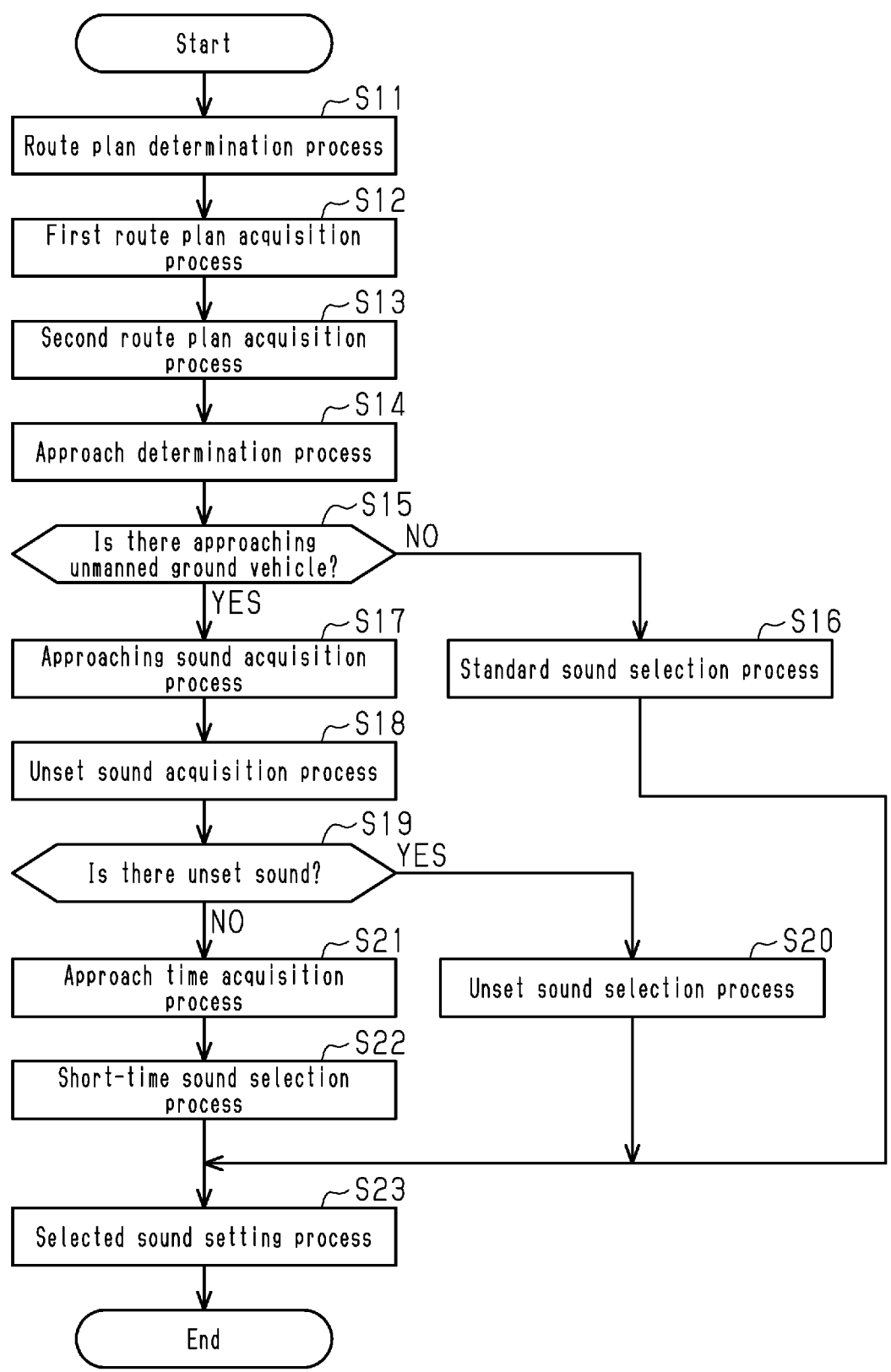

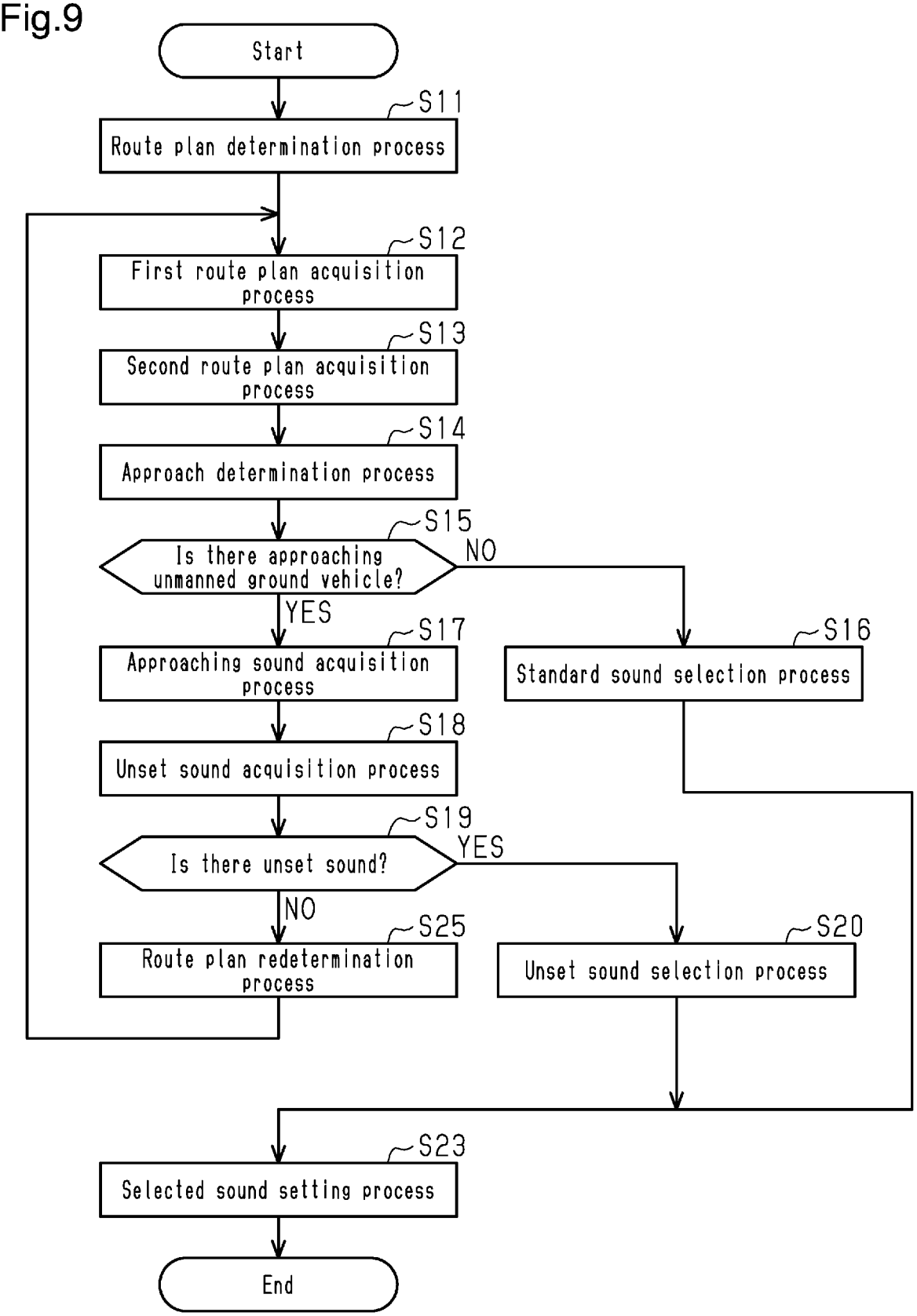

LOGISTICS MANAGEMENT SERVER, INFORMATION PROCESSING METHOD, AND INFORMATION PROCESSING SYSTEM

BACKGROUND

1. Field

The present disclosure relates to a logistics management server, an information processing method, and an information processing system.

2. Description of Related Art

Information processing systems that cause an unmanned vehicle to deliver a package to a user have been in practical use. PCT Publication No. 2018/216502 discloses an example of an information processing system that includes an unmanned vehicle (cart) that travels between points at which a package is to be received. The unmanned ground vehicle outputs a sound (e.g., alert or beep) from a speaker depending on the situation. An alert is output, for example, when the situation is risky, when the vehicle turns, when the vehicle stops, when the vehicle starts traveling, or when an emergency occurs. A beep is output when, for example, an item is left in a box of the unmanned ground vehicle.

When multiple unmanned ground vehicles each deliver a package in the same delivery area, these unmanned ground vehicles may be present at an intersection or a delivery place. In such a situation, when the unmanned ground vehicles each output a sound, the sounds may overlap each other. In this case, it is difficult for a person located near the unmanned ground vehicles to identify the unmanned ground vehicle that outputs a sound to that person. Thus, the person may have trouble handling the unmanned ground vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A logistics management server according to an aspect includes circuitry. The circuitry is configured to acquire route plans for unmanned vehicles each delivering a package to a delivery point. The unmanned vehicles include a first unmanned vehicle and a second unmanned vehicle. The circuitry is further configured to determine whether the first unmanned vehicle and the second unmanned vehicle will approach each other based on the acquired route plan for the first unmanned vehicle and the acquired route plan for the second unmanned vehicle, and when determining that the first unmanned vehicle and the second unmanned vehicle will approach each other, set sound identification information such that a sound output from the first unmanned vehicle and a sound output from the second unmanned vehicle each have a different characteristic.

An information process method according to another aspect includes acquiring route plans for unmanned vehicles each delivering a package to a delivery point. The unmanned vehicles include a first unmanned vehicle and a second unmanned vehicle. The information process method further includes determining whether the first unmanned vehicle and the second unmanned vehicle will approach each other based on the acquired route plan for the first unmanned vehicle and the acquired route plan for the second unmanned vehicle, and when determining that the first unmanned vehicle and the second unmanned vehicle will approach each other, setting sound identification information such that a sound output from the first unmanned vehicle and a sound output from the second unmanned vehicle each have a different characteristic.

An information processing system according to a further aspect includes a logistics management server and unmanned vehicles. The unmanned vehicles include a first unmanned vehicle and a second unmanned vehicle. At least one of the logistics management server or each of the unmanned vehicles includes circuitry. The circuitry of the logistics management server or the circuitry of the unmanned vehicle is configured to acquire travel plans for the unmanned vehicles each delivery a package to a delivery point, determine whether the first unmanned vehicle and the second unmanned vehicle will approach each other based on the acquired route plan for the first unmanned vehicle and the acquired route plan for the second unmanned vehicle, and when determining that the first unmanned vehicle and the second unmanned vehicle will approach each other, set sound identification information such that a sound output from the first unmanned vehicle and a sound output from the second unmanned vehicle each have a different characteristic.

Other features and aspects will be apparent from the following detailed description, the drawings, and the claims.

BRIEF DESCRIPTION OF DRAWINGS

FIG. 3 is a table schematically showing the delivery plan information in the first embodiment.

FIG. 4 is a table schematically showing the sound attribute information in the first embodiment.

FIG. 5 is a flowchart illustrating a procedure of the sound setting process in the first embodiment.

FIG. 9 is a flowchart illustrating a procedure of the sound setting process in a third embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A logistics management server, an information processing method, and an information processing system according to a first embodiment will now be described. In the following description, the logistics management server is a server 10. Further, the information processing system is a logistics management system 1 that delivers a package using an unmanned ground vehicle (UGV).

Logistics Management System

Figure 1:
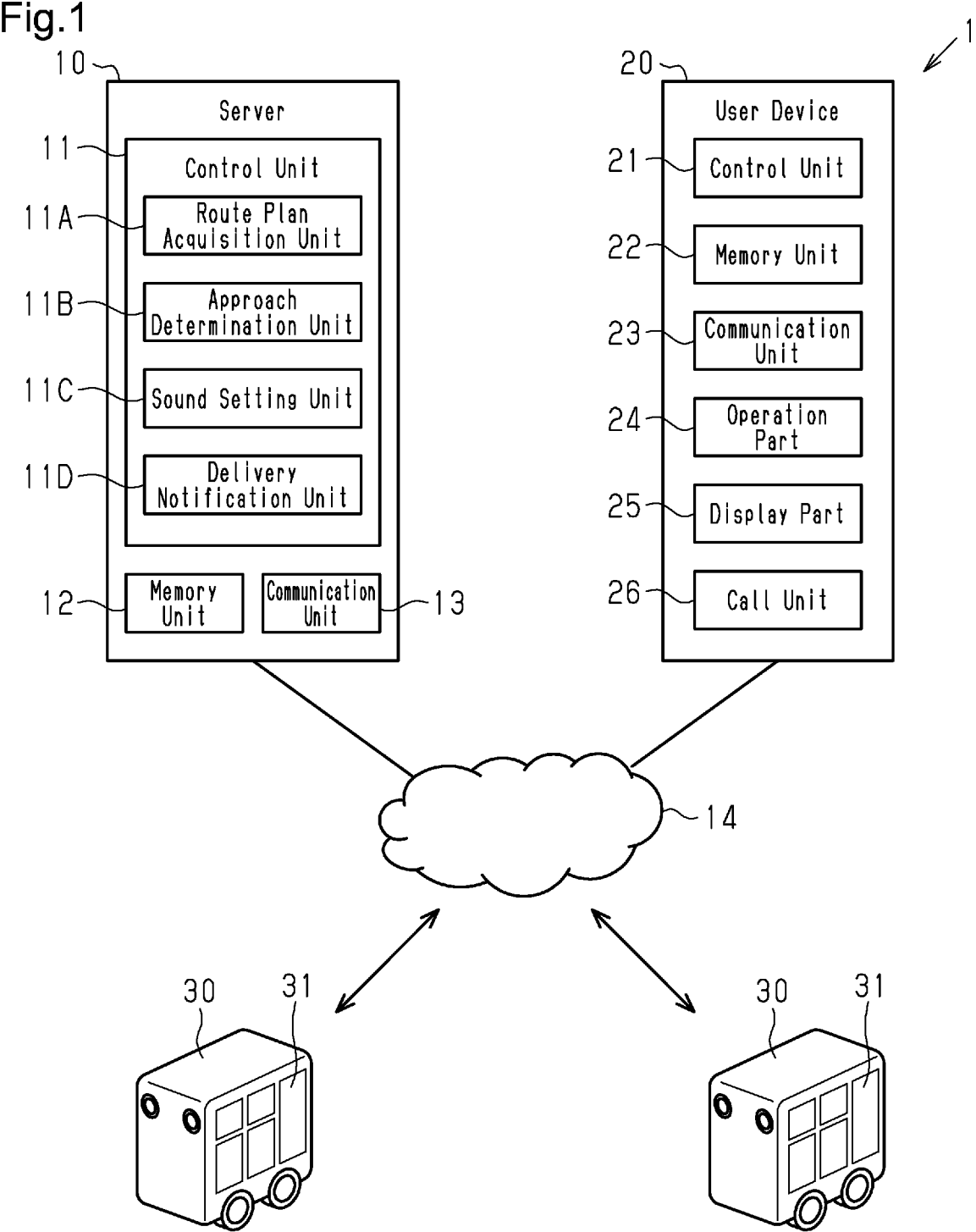
FIG. 1 is a diagram schematically showing the configuration of a logistics management system according to a first embodiment.

As shown in FIG. 1, the logistics management system 1 includes a server 10 and unmanned ground vehicles 30. The logistics management system 1 is connected to a user device 20 via a network 14.

Server

The server 10 is managed by a logistics manager or a manager that offers logistics management services. The server 10 includes a control unit 11, a memory unit 12, and a communication unit 13. The control unit 11 includes an arithmetic logic unit and a memory (memory medium). The arithmetic logic unit loads, for example, an operating system and various programs (e.g., logistics management program) into the memory of the control unit 11 from the memory unit 12 or a storage, and executes instructions retrieved from the memory of the control unit 11. The control unit 11 may include the following circuitry.

(1) Circuitry including one or more processors that run according to a computer program (software);
(2) Circuitry including one or more dedicated hardware circuits that execute at least part of various processes; or
(3) Circuitry including a combination thereof.

The control unit 11 includes a CPU and a memory (e.g., RAM and ROM). The memory stores program codes or commands configured to cause the CPU to execute processes. The memory (i.e., computer-readable medium) includes any type of medium that is accessible by general-purpose computers or dedicated computers. Alternatively, instead of or in addition to the CPU, the control unit 11 may include a dedicated hardware circuit (for example, application specific integrated circuit (ASIC)) that executes hardware processing for at least part of the processes executed by the arithmetic logic unit.

The memory unit 12 is an auxiliary storage device (memory medium), and includes various types of information used to manage logistics. The communication unit 13 is implemented as hardware, software, or a combination thereof. The communication unit 13 sends and receives data to and from the user device 20 and an unmanned ground vehicle 30 via the network 14. The server 10 may include an operation part or a display part for which a logistics manager performs an input operation.

In particular, the control unit 11 includes a route plan acquisition unit 11A. The route plan acquisition unit 11A determines the route plan for an unmanned ground vehicle 30 that delivers a package to a delivery point. Thus, the route plan acquisition unit 11A acquires the route plan for the unmanned ground vehicle 30.

The control unit 11 includes an approach determination unit 11B. The approach determination unit 11B determines whether multiple unmanned ground vehicles 30 will approach each other based on the route plans for the unmanned ground vehicles 30. That is, the approach determination unit 11B determines whether a first unmanned vehicle and a second unmanned vehicle will approach each other based on the route plan for the first unmanned vehicle and the route plan for the second unmanned vehicle.

The control unit 11 includes a sound setting unit 11C. The sound setting unit 11C sets sound identification information for an unmanned ground vehicle 30. The sound identification information is allocated to a sound that has a unique characteristic. In other words, the sound identification information indicates the timbre of a sound.

The control unit 11 includes a delivery notification unit 11D. The delivery notification unit 11D issues a sound notification related to the delivery of a package to a delivery point, based on the sound identification information. The sound notification may indicate that the package will be delivered to the delivery point (e.g., "I am shortly arriving at the delivery point."). The sound notification may also indicate the delivery time at which the package will be delivered to the delivery point (e.g., "I am arriving at the delivery point at the specified time.").

User Device

The user device 20 is an information processing device used by a user who uses the logistics management system 1. The user device 20 is a multi-functional telephone terminal (e.g., smartphone), a tablet terminal, a personal computer, a wearable computer, or another information processing device.

The user device 20 includes a control unit 21, a memory unit 22, a communication unit 23, an operation part 24, a display part 25, and a call unit 26. The control unit 21 includes an arithmetic logic unit and a memory (memory medium). The control unit 11 has the same hardware configuration as the server 10 and thus has one of the above configurations (1) to (3). The control unit 21 loads, for example, an operating system and various programs (e.g., a program that executes delivery-related processes) into the memory of the control unit 21 from the memory unit 22 or a storage, and executes instructions retrieved from the memory of the control unit 21.

The memory unit 22 has the same hardware configuration as the memory unit 12 of the server 10. The memory unit 22 may store a program that executes processes related to delivery. The program may be an application program used for receiving the offer of delivery services or may be a program that receives the offer of delivery services using a social networking service. Alternatively, the program may be an application program capable of receiving notification emails related to delivery. As another option, the memory unit 22 may store a web browser program that interprets a markup language, such as HyperText Markup Language (HTML), and JavaScript®. The web browser program displays a delivery-related webpage that has been acquired from a web server included in the logistics management system 1. The communication unit 23 is implemented as hardware, software, or a combination thereof. The communication unit 23 sends and receives data to and from the server 10 via the network 14. The operation part 24 is a touch panel integrated with the display part 25 (e.g., display). Alternatively, the operation part 24 is, for example, an operation button, a keyboard, a mouse, or a controller on a case of the user device 20. The display part 25 outputs various types of images according to an output instruction of the control unit 21. The call unit 26 is configured to make a call to another device. The call unit 26 may include a speaker and a microphone.

Unmanned Ground Vehicle

The unmanned ground vehicle 30 is a movable device without a person onboard. The unmanned ground vehicle 30 is managed by a logistics manager or another owner. One unmanned ground vehicle 30 may execute vehicle-to-vehicle communication with another unmanned ground vehicle 30 that is located nearby. The unmanned ground vehicle 30 includes a box 31 that accommodates a package that is to be delivered. Each unmanned ground vehicle 30 of FIG. 1 includes multiple boxes 31. In the unmanned ground vehicle 30, each box 31, the package, and the user that receives the package are stored in association with each other. In a situation in which the user is receiving the package, the unmanned ground vehicle 30 outputs a sound that assists the receiving of a package (e.g., "Box number 1 will open.").

Figure 2:
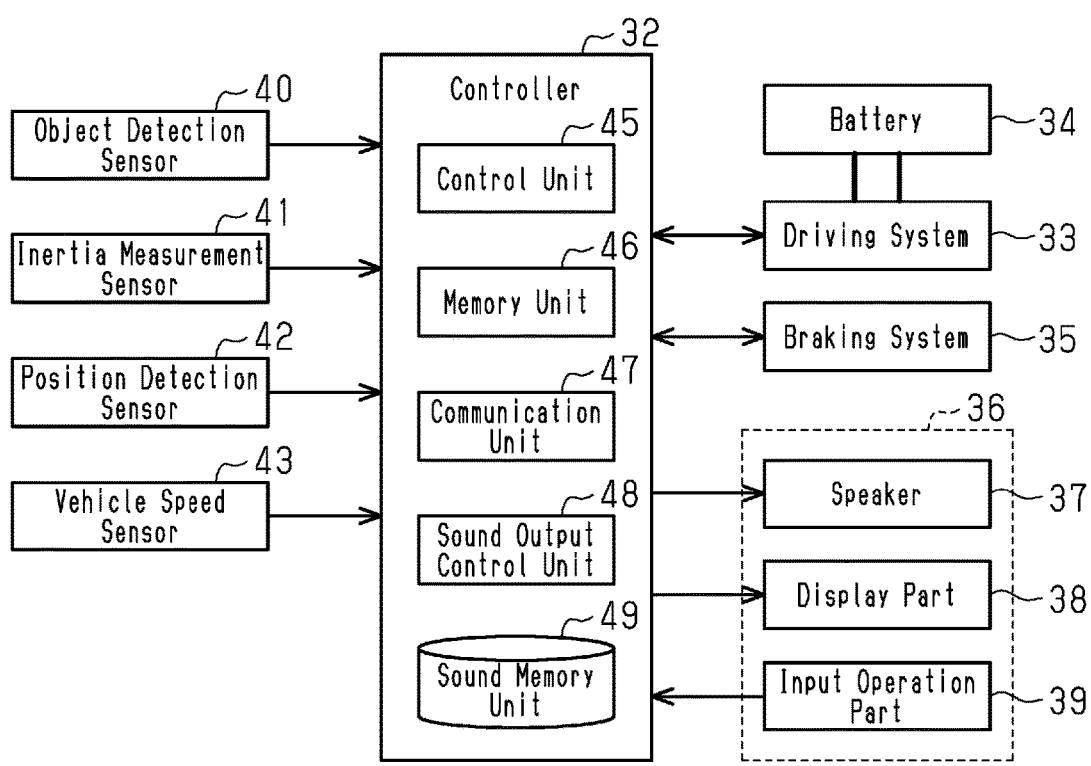
FIG. 2 is a block diagram showing the configuration of the unmanned ground vehicle in the first embodiment.

The configuration of the unmanned ground vehicle 30 will now be described with reference to FIG. 2. The unmanned ground vehicle 30 includes a controller 32, a driving system 33, a battery 34, and a braking system 35.

The controller 32 has the same hardware configuration as the server 10 and thus has one of the above configurations (1) to (3).

The driving system 33 includes, for example, a drive source that is driven by electric power supplied from the battery 34, a power transmission mechanism that is operated by the power obtained from the drive source, and a control circuit that controls the drive source. In the present embodiment, the drive source is an electric motor. The drive source may be an engine that is driven by consuming fuel. In this case, instead of the battery 34, the unmanned ground vehicle 30 includes a fuel supplying unit that supplies the drive source with fuel. The unmanned ground vehicle 30 may include a hybrid system equipped with various types of drive sources. The power transmission mechanism transmits the power of the drive source to wheels. The unmanned ground vehicle 30 may be able to move not only in the front-rear direction but also in a direction that intersects the front-rear direction. For example, the wheels may be able to rotate not only in a first direction and its opposite direction but also in multiple directions, including a direction that is orthogonal to the first direction. The braking system 35 stops rotation of the wheels based on the signal output from the controller 32. Based on the route plan, the controller 32 outputs a command for motion (e.g., start, left turn, or right turn) to the driving system 33 and outputs a stop command or a deceleration command to the braking system 35.

The unmanned ground vehicle 30 further includes a human machine interface (HMI) 36. The HMI 36 includes a speaker 37. The HMI 36 may also include a display part 38 and an input operation part 39.

The speaker 37 is implemented as a combination of hardware and software. The speaker 37 outputs a warning sound, an alert, or a sound related to operation guidance for receiving a package.

The display part 38 indicates information related to an operation for receiving the package. The input operation part 39 is, for example, a touch panel to which the user enters an authentication code such as a personal identification number (PIN), an input device including a button, or a scanner that recognizes a barcode or a two-dimensional code presented.

The unmanned ground vehicle 30 further includes an object detection sensor 40, an inertia measurement sensor 41, a position detection sensor 42, and a vehicle speed sensor 43. These sensors each output a detection result to the controller 32. The object detection sensor 40 is configured to detect an object located nearby. For example, the object detection sensor 40 is a capturing device. The capturing device may include an omnidirectional camera that performs capturing in all directions (the entire sphere), the center of which is the unmanned ground vehicle 30, or multiple visible light cameras. Instead, the object detection sensor 40 may be a distance measurement sensor (e.g., a millimeter wave radar or an ultrasonic sensor). Alternatively, the object detection sensor 40 may be an infrared sensor. In one example, the object detection sensor 40 may be a combination of an image sensor and an infrared sensor in which a Lidar sensor is employed. Lidar stands for light detection and ranging or laser imaging, detection, and ranging. The object detection sensor 40 is not limited to the above sensors. The unmanned ground vehicle 30 includes two or more of these sensors in accordance with the intended use.

Examples of the inertia measurement sensor 41 include an acceleration sensor or a gyro sensor. Examples of the position detection sensor 42 include a GPS sensor, a geomagnetic sensor, an altitude sensor, and a displacement sensor. The vehicle speed sensor 43 is disposed on a wheel to detect the speed of the unmanned ground vehicle 30.

The controller 32 will now be described. The controller 32 includes a control unit 45, a memory unit 46, and a communication unit 47. The configuration of the control unit 45 is substantially the same as that of the control unit 11 of the server 10.

The configuration of the memory unit 46 is substantially the same as that of the memory unit 12 of the server 10. The memory unit 46 stores an autonomous traveling program and various types of information (e.g., map information) that is necessary for autonomous traveling. Further, the memory unit 46 stores route plan information and delivery plan information. The route plan information indicates a route plan from a start point (e.g., a warehouse or a store) to an end point via a package delivery point. The delivery plan information associates a package and a user. The route plan information includes identification information (e.g., an intersection and a road). The route plan information may also include one or more delivery points. The delivery plan information may include, for example, one or more of the identification information of a package, the delivery point of the package, and the number of a box that accommodates the package.

The communication unit 47 is implemented as hardware, software, or a combination thereof. The communication unit 47 sends and receives data to and from the user device 20 and the server 10 via the network 14. The communication unit 47 may be configured to execute wireless communication in conformity to a communication standard of vehicle-to-vehicle communication.

The communication unit 47 sends various notifications to the user device 20 via the network 14. The unmanned ground vehicle 30 may send notifications to the user device 20 via the server 10. Alternatively, the unmanned ground vehicle 30 may send notifications to the user device 20 without using the server 10. The unmanned ground vehicle 30 may be connected to a manager terminal (not shown) used by a delivery manager via the network 14. Using the manager terminal, the delivery manager may visually check an image captured by the image sensor of the unmanned ground vehicle 30 to monitor the state of the unmanned ground vehicle 30.

The controller 32 includes a sound output control unit 48 and a sound memory unit 49. The sound output control unit 48 outputs a sound corresponding to a situation from the speaker 37 based on the sound identification information selected by the control unit 45. For example, the sound identification information includes three numbers (e.g., 1 to 3). For example, a different type of the sound identification information is allocated to each of multiple virtual speakers that are set on a system. For example, the sound of a speech given by a particular male person is associated with the sound identification information of 1. The sound of a speech given by a particular female person is associated with the sound identification information of 2. The sound of a speech given by a different female person is associated with the sound identification information of 3. That is, the sound based on data associated with the sound identification information of 1 to 3 can be recognized as a speech given by a person who speaks in everyday life as the user identifies the voice of that person as a voice specific to that person. For example, one or more characteristics of a sound include the distribution of frequencies (e.g., a formant), a basic frequency (e.g., a pitch), or a frequency having the largest strength. The characteristics of a sound may also include a speaking speed or an intonation.

The sound output control unit 48 outputs, for example, a sound that alerts a person located nearby to the traveling of the unmanned ground vehicle 30 and a sound that guides an operation for receiving a package or produces an alert. When an event that cause a sound to be output (hereinafter referred to as a sound output event) occurs, the sound output control unit 48 selects sound data suitable for the sound output event from the sound data stored in the sound memory unit 49. Then, the sound output control unit 48 uses waveform data included in the selected sound data to output the sound from the speaker 37. The waveform data corresponds to output control data that is used to output a sound from the speaker 37.

The sound memory unit 49 stores multiple types of sound data. The multiple types of sound data include waveform data that differs between multiple types of the sound identification information. For example, the sound data includes waveform data used to output a sound having content that differs depending on each sound output event. The control unit 45 and the sound output control unit 48 may be integrated into an apparatus. The sound memory unit 49 and the memory unit 46 may be integrated into an apparatus.

Data Configuration

The data stored in the memory 12 of the server 10 and the memory unit 46 of the unmanned ground vehicle 30 will now be described with reference to FIGS. 3 and 4.

FIG. 3 shows an example of the data configuration of delivery plan information 51. The delivery plan information 51 is created for each unmanned ground vehicle 30 that delivers a package. The server 10 stores, in the memory unit 12, the delivery plan information 51 corresponding to the unmanned ground vehicles 30 each delivering a package. The unmanned ground vehicle 30 stores its delivery plan information 51 in the memory unit 46.

The delivery plan information 51 of FIG. 3 indicates the delivery plan of one unmanned ground vehicle 30. The delivery plan information 51 includes a delivery number, a user ID, a delivery address, a delivery date, sound identification information, a box number, a notification destination, and a delivery status. The delivery number is identification information allocated to a package that is to be delivered. The user ID and delivery address each indicate a user who receives a package or the address of the user. The delivery address may be position information related to an area common to multiple users as a package delivery point. The delivery date indicates the date and time period in which a package is scheduled to be delivered. The sound identification information is allocated to the characteristic of a sound that is output from the unmanned ground vehicle 30. The sound identification information is used when a package is delivered. For example, the sound identification information may be allocated to the characteristic of a sound of which a user is notified when the unmanned ground vehicle 30 reaches the delivery point. The box number indicates the identification information of a box 31 of the unmanned ground vehicle 30. That is, the box 31 is associated with a package corresponding to the delivery number. The notification destination is a destination selected when a notification is sent to the user. For example, a notification is sent on at least one of the following points in time: when the server 10 accepts a delivery request; when the unmanned ground vehicle 30 leaves a station; in a period during which the unmanned ground vehicle 30 departs the station and then reaches the delivery location; and when the unmanned ground vehicle 30 reaches the delivery location. The notification is sent from the unmanned ground vehicle 30 or the server 10 to the user device 20. The notification destination is, for example, the email address of the user, the telephone number of the user, or a device token of the user device 20. The notification destination may also include a sending destination to a communication device (e.g., an intercom). The delivery status indicates the delivery status of a package. For example, the delivery status is one of statuses including "delivery completed," "in transit," and "not yet delivered." The delivery plan information 51 may include a delivery sequence and a delivery route.

FIG. 4 shows sound attribute information 52. The unmanned ground vehicle 30 stores, in the memory unit 46 as sound data, the sound attribute information 52 and waveform data (not shown) associated therewith.

The sound attribute information 52 includes sound identification information 52A and content identification information 52B. For example, if there are three types of sounds each having a different characteristic, the sound identification information 52A may be any one of 1 to 3. The content identification information 52B is used to identify the content of a sound. The content of a sound includes, for example, a message given as guidance during traveling or operation guidance for a user to receive a package. Examples of the message include "I am turning left," "I am turning right," "I am about to stop," "I am about to start," and "The number of the delivery box is 1." Multiple types of content identification information 52B are associated with one type of sound identification information 52A. Further, the waveform data corresponding to the sound identification information 52A is associated with the content identification information 52B. Multiple types of waveform data associated with the same sound identification information 52A each have the same sound characteristic. The sound output control unit 48 outputs a sound using the waveform data associated with the sound output event that has occurred. The sound data may also be stored in the memory unit 46 of the server 10.

Processes

The processes mainly executed by the control unit 11 of the server 10 will now be described. The control unit 11 executes at least a route plan acquisition process, an approach determination process, and a sound setting process.

The control unit 11 executes the route plan acquisition process. The route plan acquisition process is a process that acquires the route plan for an unmanned ground vehicle 30 that delivers a package to a delivery point. In particular, the route plan acquisition process is a process that acquires the route plans for multiple unmanned ground vehicles 30. Specifically, the route plan acquisition process is a process that acquires the route plan for an unmanned ground vehicle 30 that is currently traveling (hereinafter referred to as a traveling unmanned ground vehicle 30) and the route plan for an unmanned ground vehicle 30 that has not started traveling (hereinafter referred to as a pre-traveling unmanned ground vehicle 30). In this manner, the control unit 11 that executes the route plan acquisition process is used as the route plan acquisition unit 11A.

The control unit 11 executes the approach determination process. The approach determination process is a process that determines whether multiple unmanned ground vehicles 30 will approach each other based on the route plans for the unmanned ground vehicles 30. In particular, the approach determination process is a process that determines whether a pre-traveling unmanned ground vehicle 30 will approach a traveling unmanned ground vehicle 30. In this manner, the control unit 11 that executes the approach determination process is used as the approach determination unit 11B.

The control unit 11 executes the sound setting process. The sound setting process is a process that sets the sound identification information for a pre-traveling unmanned ground vehicle 30. In particular, in the sound setting process, when it is determined that a pre-traveling unmanned ground vehicle 30 will approach a traveling unmanned ground vehicle 30, sound identification information that is different from the sound identification information of the traveling unmanned ground vehicle 30, which will approach, can be set for the pre-traveling unmanned ground vehicle 30. In this manner, the control unit 11 that executes the sound setting process is used as the sound setting unit 11C.

Sound Setting Process

The sound setting process will now be described with reference to FIG. 5. The sound setting process is executed by the control unit 11 of the server 10 when a delivery request is issued. The delivery request is issued before an unmanned ground vehicle 30 starts traveling. Thus, the sound setting process is executed before the unmanned ground vehicle 30 for which the delivery request is issued starts traveling.

As shown in FIG. 5, in step S11, the control unit 11 executes a route plan determination process. In this process, the control unit 11 refers to the delivery request to determine the route plan for the unmanned ground vehicle 30 for which the delivery request is issued.

The unmanned ground vehicle 30 for which the delivery request is issued is a pre-traveling unmanned ground vehicle 30. The route plan indicates a travel route and time from a travel start point to a travel end point via a package delivery point. The travel route includes identification information (e.g., a road and an intersection). The start point and the end point are stations (e.g., warehouses and stores). The start point may be the same as or different from the end point.

In particular, the control unit 11 acquires a delivery number that corresponds to the delivery request. The control unit 11 determines the route plan by reading a delivery address and a delivery time that correspond to the acquired delivery number. Then, the control unit 11 stores the determined route plan in the delivery plan information 51 of the pre-traveling unmanned ground vehicle 30. The unmanned ground vehicle 30 for which the delivery request is issued, or the unmanned ground vehicle 30 that is the target of such a request, may be hereinafter referred to as a targeted unmanned ground vehicle 30.

In step S12, the control unit 11 executes a first route plan acquisition process. In this process, the control unit 11 acquires the route plan for the targeted unmanned ground vehicle 30 determined in step S11. That is, the control unit 11 acquires the route plan for the targeted unmanned ground vehicle 30.

In step S13, the control unit 11 executes a second route plan acquisition process. In this process, the control unit 11 refers to the delivery plan information 51 of another unmanned ground vehicle 30 that is currently traveling (hereinafter referred to as a different traveling unmanned ground vehicle 30) to acquire the route plan for the different traveling unmanned ground vehicle 30. In this manner, the control unit 11 that executes step S12 and step S13 is used as the route plan acquisition unit 11A.

The different traveling unmanned ground vehicle 30 has started traveling before the targeted unmanned ground vehicle 30. The route plan for the different traveling unmanned ground vehicle 30 has been determined before the route plan for the targeted unmanned ground vehicle 30.

In step S14, the control unit 11 executes the approach determination process. In this process, the control unit 11 determines whether the targeted unmanned ground vehicle 30 will approach the different traveling unmanned ground vehicle 30, based on the route plan for the targeted unmanned ground vehicle 30 and the route plan for the different traveling unmanned ground vehicle 30. In this manner, the control unit 11 that executes step S14 is used as the approach determination unit 11B.

Specifically, the control unit 11 refers to the route plan for the targeted unmanned ground vehicle 30 to acquire the travel route and time of the targeted unmanned ground vehicle 30. Further, the control unit 11 refers to the route plan for the different traveling unmanned ground vehicle 30 to acquire the travel route and time of the different traveling unmanned ground vehicle 30. The control unit 11 determines whether the targeted unmanned ground vehicle 30 will approach the different traveling unmanned ground vehicle 30, based on the travel route and time of the targeted unmanned ground vehicle 30 and the travel route and time of the different traveling unmanned ground vehicle 30.

When multiple unmanned ground vehicles 30 are located in a predetermined range, the unmanned ground vehicles 30 will approach each other. The predetermined range is a range in which a person can hear a sound output from each unmanned ground vehicle 30. For example, in a case in which the person can hear the sound output from the unmanned ground vehicle 30 when the person is located in a distance of less than or equal to 100 meters from the unmanned ground vehicle 30 and the person cannot hear that sound when the person is located in a distance of greater than 100 meters from the unmanned ground vehicle 30, the predetermined range is a range of less than or equal to 100 meters.

In step S15, the control unit 11 determines whether there is an approaching unmanned ground vehicle 30. When determining that there is no approaching unmanned ground vehicle 30 (step S15: NO), the control unit 11 proceeds to step S16. When determining that there is an approaching unmanned ground vehicle 30 (step S15: YES), the control unit 11 proceeds to step S17. The different traveling unmanned ground vehicle 30 that is approaching the targeted unmanned ground vehicle 30 may be hereinafter referred to as an approaching unmanned ground vehicle 30.

In step S16, the control unit 11 executes a standard sound selection process. In this process, the control unit 11 selects standard sound identification information. The standard sound identification information may be sound identification information of 1. The sound associated with the standard sound identification information is heard most frequently by a user as a sound output from an unmanned ground vehicle 30. Alternatively, the sound associated with the standard sound identification information is easiest to hear for a person located near the unmanned ground vehicle 30. The sound identification information 52A selected in step S16 may be the sound identification information 52A having the highest priority among the priorities each allocated to a corresponding type of the sound identification information 52A.

Then, in step S23, the control unit 11 sets the standard sound identification information for the targeted unmanned ground vehicle 30. Thus, when determining that no different traveling unmanned ground vehicle 30 will approach the targeted unmanned ground vehicle 30, the control unit 11 sets the standard sound identification information for the targeted unmanned ground vehicle 30. In this manner, the control unit 11 that executes step S23 is used as the sound setting unit 11C.

In step S17, the control unit 11 executes an approaching sound acquisition process. In this process, the control unit 11 refers to the delivery plan information 51 to acquire the sound identification information of an approaching unmanned ground vehicle 30.

In step S18, the control unit 11 executes an unset sound acquisition process. In this process, the control unit 11 acquires sound identification information that has not been set for the approaching unmanned ground vehicle 30. The sound identification information that has not been set for the approaching unmanned ground vehicle 30 may be hereinafter referred to as unset sound identification information.

In step S19, the control unit 11 determines whether the unset sound identification information is present. When determining that the unset sound identification information is present (step S19: YES), the control unit 11 proceeds to step S20. When determining that the unset sound identification information is not present (step S19: NO), the control unit 11 proceeds to step S21.

In step S20, the control unit 11 executes an unset sound selection process. In this process, the control unit 11 selects one type of the unset sound identification information. In particular, when there are multiple types of unset sound identification information, the control unit 11 selects one of the types of unset sound identification information in accordance with a predetermined priority that corresponds to the sound identification information. The priority may become higher from the sound identification information of 1, that of 2, and that of 3 in this order.

Then, in step S23, the control unit 11 sets the unset sound identification information for the targeted unmanned ground vehicle 30. Thus, when determining that there is a different traveling unmanned ground vehicle 30 that will approach the targeted unmanned ground vehicle 30, the control unit 11 sets the unset sound identification information for the targeted unmanned ground vehicle 30.

Particularly, in a case in which the standard sound identification information has not been set for the approaching unmanned ground vehicle 30, the control unit 11 sets the standard sound identification information for the targeted unmanned ground vehicle 30. In a case in which the standard sound identification information has been set for the approaching unmanned ground vehicle 30, the control unit 11 sets unset sound identification information that is different from the standard sound identification information for the targeted unmanned ground vehicle 30. This allows the control unit 11 to set the sound identification information such that the sound output from the targeted unmanned ground vehicle 30 and the sound output from the approaching unmanned ground vehicle 30 each have a different characteristic.

In step S21, the control unit 11 executes an approach time acquisition process. In this process, the control unit 11 refers to the route plan for the targeted unmanned ground vehicle 30 and the route plan for the approaching unmanned ground vehicle 30 to acquire an approach time in which an approaching unmanned ground vehicle 30 approaches the targeted unmanned ground vehicle 30.

In step S22, the control unit 11 selects the sound identification information related to one of multiple approaching unmanned ground vehicles 30 that will approach the targeted unmanned ground vehicle 30 in a relatively short amount of time. That is, the control unit 11 selects the same sound identification information as that of the approaching unmanned ground vehicle 30 that will approach the targeted unmanned ground vehicle 30 in a relatively short amount of time.

Then, in step S23, the control unit 11 sets the sound identification information that has been set for the approaching unmanned ground vehicle 30 that will approach the targeted unmanned ground vehicle 30 in a relatively short amount of time. Thus, when the unset sound identification information is not present (i.e., in a case in which all the types of sound identification information have been set), the control unit 11 sets, for the targeted unmanned ground vehicle 30, the same sound identification information as the sound identification information of one of the approaching unmanned ground vehicles 30 that will approach the targeted unmanned ground vehicle 30 in a relatively short amount of time.

In this manner, the server 10 sets the route plan and the sound identification information for the targeted unmanned ground vehicle 30. Further, the control unit 45 travels by driving the driving system 33 in accordance with the determined route plan.

When determining that a sound output even has occurred, the control unit 45 causes the unmanned ground vehicle 30 to output a sound based on the set sound identification information. Specifically, the control unit 45 selects the content identification information 52B corresponding to the sound output event and sends a sound output request to the sound output control unit 48. The sound output control unit 48 outputs a sound based on the sound identification information 52A and the content identification information 52B selected by the control unit 45.

The sound output event is an event (condition) that causes an unmanned ground vehicle 30 to output a sound to its surroundings. Multiple sound output events are set. An example of the sound output event is a risky situation that occurs near the unmanned ground vehicle 30. Another example of the sound output event is an event related to a traveling state of the unmanned ground vehicle 30 (e.g., turn, stop, or start). A further example of the sound output event is a situation in which a user who receives a package is supported. The support for receiving a package is necessary when, for example, the user starts operating the unmanned ground vehicle 30 or an emergency (e.g., the user forgot to take a package) occurs.

Notification Process

The notification process will now be described with reference to FIG. 6. The notification process is executed by the control unit 11 of the server 10.

Figure 6:
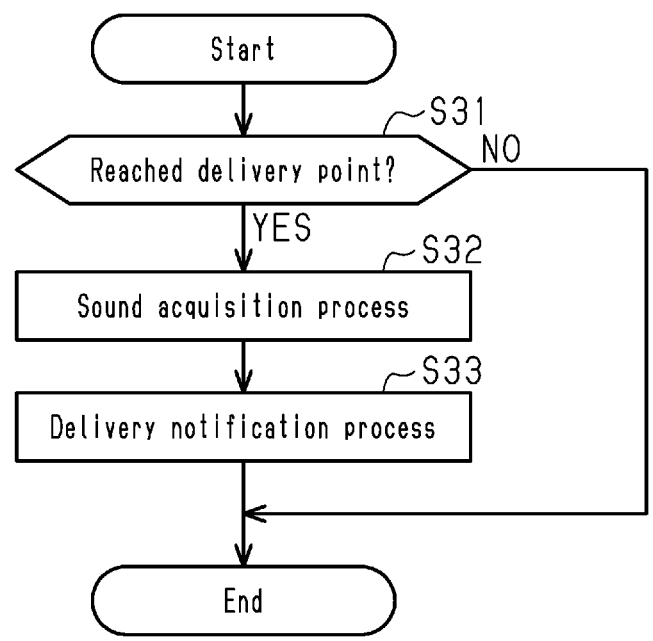
FIG. 6 is a flowchart illustrating a procedure of the notification process in the first embodiment.

As shown in FIG. 6, in step S31, the control unit 11 determines whether the unmanned ground vehicle 30 has reached a package delivery point by communicating with the unmanned ground vehicle 30. When determining that the unmanned ground vehicle 30 has reached the package delivery point, the control unit 11 proceeds to step S32. When determining that the unmanned ground vehicle 30 has not reached the package delivery point, the control unit 11 ends the notification process.

In step S32, the control unit 11 executes a sound acquisition process. In this process, the control unit 11 refers to the delivery plan information 51 to acquire the sound identification information corresponding to the unmanned ground vehicle 30 that has reached the package delivery point.

In step S33, the control unit 11 executes a delivery notification process. In this process, the control unit 11 refers to the delivery plan information 51 to acquire a notification destination corresponding to the unmanned ground vehicle 30 that has reached the package delivery point. Then, the control unit 11 executes, for the user device 20 serving as the notification destination, a sound notification related to the delivery of the package to the delivery point based on the acquired sound identification information. Thus, the control unit 11 executes the sound notification related to the package delivery point based on the acquired sound identification information set for the unmanned ground vehicle 30 that has reached the package delivery point. In this manner, the control unit 11 that executes step S33 is used as the delivery notification unit 11D. In the present embodiment, the targeted unmanned ground vehicle 30 corresponds to an example of the first unmanned vehicle. In the present embodiment, the different traveling unmanned ground vehicle 30 corresponds to an example of the second unmanned vehicle.

Operation of First Embodiment

The operation of the first embodiment will now be described.

Figure 7:
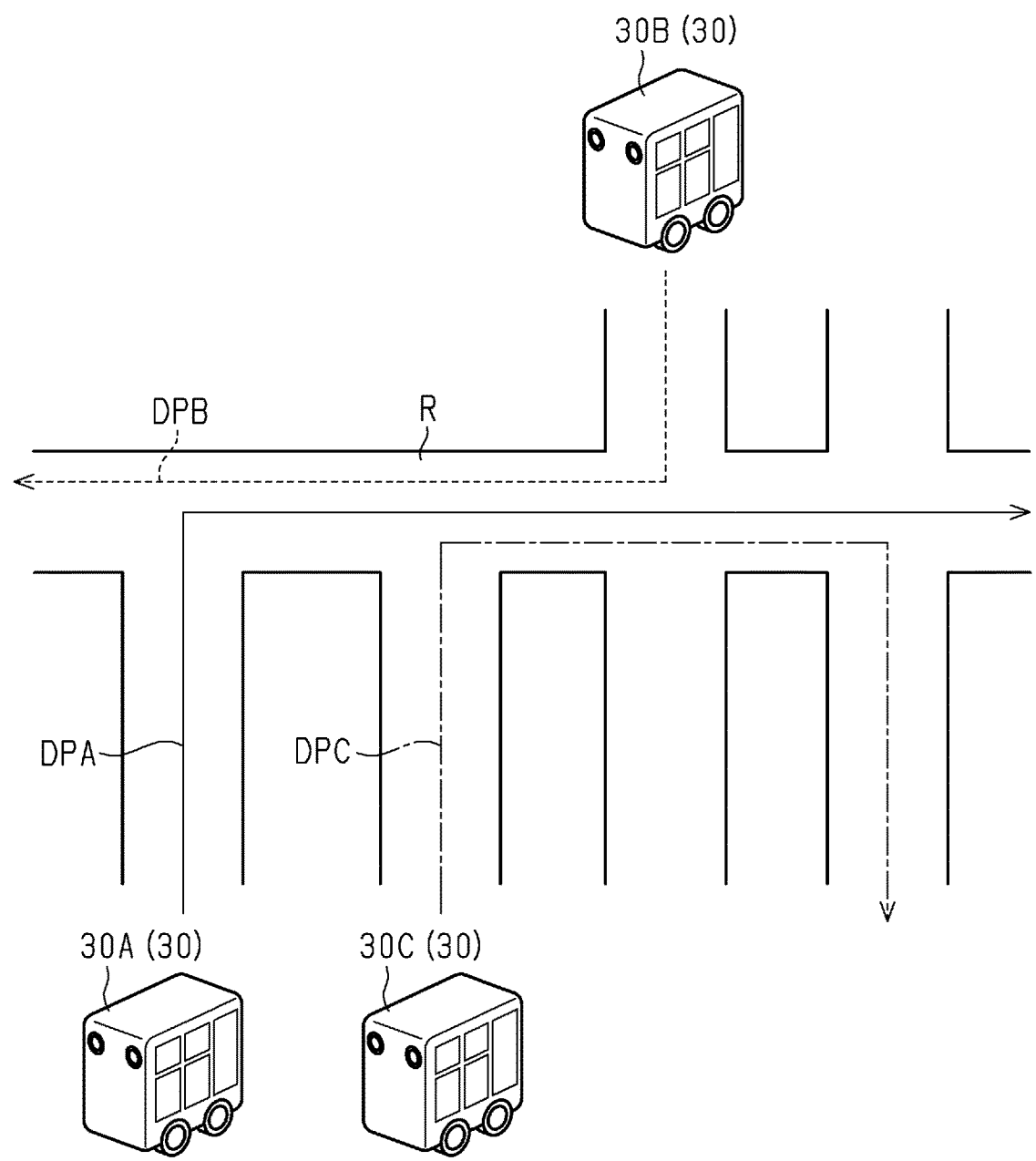
FIG. 7 is a diagram illustrating an example of how unmanned vehicles travel in the first embodiment.

In the example described below, multiple unmanned ground vehicles 30 include a first unmanned ground vehicle 30A, a second unmanned ground vehicle 30B, and a third unmanned ground vehicles 30C as shown in FIG. 7.

The first unmanned ground vehicle 30A corresponds to the targeted unmanned ground vehicle 30. The first unmanned ground vehicle 30A travels in accordance with a route plan DPA. The second unmanned ground vehicle 30B corresponds to a traveling unmanned ground vehicle 30. The second unmanned ground vehicle 30B travels in accordance with a route plan DPB. The second unmanned ground vehicle 30B corresponds to a traveling unmanned ground vehicle 30. The third unmanned ground vehicles 30C travels in accordance with a route plan DPC.

The route plan DPA of the first unmanned ground vehicle 30A overlaps part of the route plan DPB of the second unmanned ground vehicle 30B on route R. Thus, the first unmanned ground vehicle 30A may approach the second unmanned ground vehicle 30B depending on the time. That is, the second unmanned ground vehicle 30B is an approaching unmanned ground vehicle 30.

The route plan DPA of the first unmanned ground vehicle 30A overlaps part of the route plan DPC of the third unmanned ground vehicles 30C on route R. Thus, the first unmanned ground vehicle 30A may approach the third unmanned ground vehicles 30C depending on the time. That is, the third unmanned ground vehicles 30C is an approaching unmanned ground vehicle 30.

Figure 8:
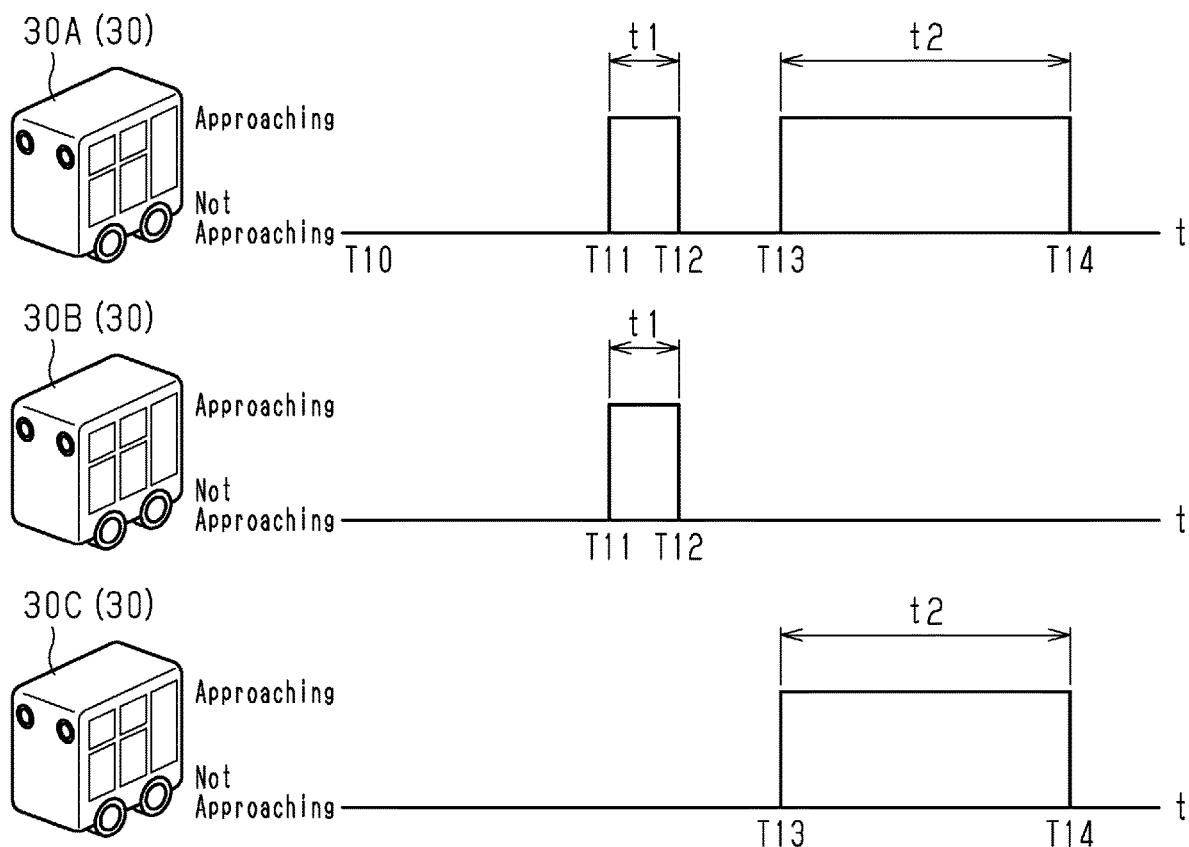
FIG. 8 is a timing diagram illustrating the example of how the unmanned vehicles travel in the first embodiment.

As shown in FIG. 8, the first unmanned ground vehicle 30A starts traveling at time T10 in accordance with its route plan. Then, the first unmanned ground vehicle 30A approaches the second unmanned ground vehicle 30B during duration t1, which is from time T11 to time T12. Further, the first unmanned ground vehicle 30A approaches the third unmanned ground vehicles 30C during duration t2, which is from time T13 to time T14. Duration t1 is shorter than duration t2.

For example, when the sound identification information of the second unmanned ground vehicle 30B is set to 2, the sound identification information of the third unmanned ground vehicles 30C is set to 3, and the unset sound identification information is 1, the sound identification information of the first unmanned ground vehicle 30A is set to 1.

Further, when the sound identification information of the second unmanned ground vehicle 30B is set to 1, the sound identification information of the third unmanned ground vehicle 30C is set to 2, and the sound identification information includes only 1 and 2, the unset sound identification information is not present. In such a case, of the second unmanned ground vehicle 30B and the third unmanned ground vehicles 30C, the same sound identification information as that of the second unmanned ground vehicle 30B, which will approach the first unmanned ground vehicle 30A in a relatively short amount of time, is set for the first unmanned ground vehicle 30A.

Advantages of First Embodiment

The advantages of the first embodiment will now be described.

(1) When determining that the targeted unmanned ground vehicle 30 will approach a different traveling unmanned ground vehicle 30, the control unit 11 allows the sound output from the different traveling unmanned ground vehicle 30 and the sound output from an approaching unmanned ground vehicle 30 to each have a different characteristic. In this configuration, even if multiple approaching unmanned ground vehicles 30 each output a sound in the same period, the characteristics of these sounds are different from each other. This allows a user located near the unmanned ground vehicles 30 to readily identify the unmanned ground vehicle 30 that outputs a sound to that user.

(2) The control unit 11 sets the sound identification information of a pre-traveling unmanned ground vehicle 30. Thus, the control unit 11 allows the sound output from the targeted unmanned ground vehicle 30 and the sound output from an approaching unmanned ground vehicle 30 to each have a different characteristic. In this configuration, the characteristics of the approaching unmanned ground vehicle 30 and the pre-traveling unmanned ground vehicle 30 are differentiated from each other by setting, for the pre-traveling unmanned ground vehicle 30, sound identification information that is different from the sound identification information of the approaching unmanned ground vehicle 30. Thus, there is no need to change the sound identification information set for a traveling approaching unmanned ground vehicle 30. This allows a user located near the unmanned ground vehicles 30 to identify the unmanned ground vehicle 30 that outputs a sound to that user, while also making the content of control less complicated.

(3) When determining that the targeted unmanned ground vehicle 30 will not approach a different traveling unmanned ground vehicle 30, the control unit 11 sets the standard sound identification information for the targeted unmanned ground vehicle 30. This allows the standard sound identification information to be set more frequently. Further, for example, the sound identification information 52A is selected with a higher priority based on how easily a sound is heard and how familiar the user is with that sound.

(4) When the standard sound identification information is not set for an approaching unmanned ground vehicle 30, the control unit 11 sets the standard sound identification information for the targeted unmanned ground vehicle 30. This allows the standard sound identification information to be set more frequently. Further, for example, the sound identification information 52A is selected with a higher priority based on how easily a sound is heard and how familiar the user is with that sound.

(5) When the standard sound identification information is set for an approaching unmanned ground vehicle 30, the control unit 11 sets, for the targeted unmanned ground vehicle 30, sound identification information that is different from the standard sound identification information. This allows a user located near the unmanned ground vehicles 30 to readily identify the unmanned ground vehicle 30 that outputs a sound to that user, while also allowing the standard sound identification information to be set more frequently.

(6) When the unset sound identification information is not present, the control unit 11 sets, for the targeted unmanned ground vehicle 30, the sound identification information set for one of the approaching unmanned ground vehicles 30 that will approach the targeted unmanned ground vehicle 30 in a relatively short amount of time. In this configuration, even if the unset sound identification information is not present, the targeted unmanned ground vehicle 30 for which the same sound identification information is set will approach the approaching unmanned ground vehicle 30 in a shorter amount of time. This reduces the difficulty for a user located near the unmanned ground vehicles 30 to identify the unmanned ground vehicle 30 that outputs a sound to that user.

(7) The control unit 11 issues a sound notification related to the delivery of a package to a delivery point, based on the set sound identification information. In this configuration, the sound output from the unmanned ground vehicle 30 has the same characteristic as the sound output through the sound notification. This allows a user to which the package will be delivered to readily identify the unmanned ground vehicle 30 that outputs a sound to that user. Further, the sound output from the unmanned ground vehicle 30 has a greater compatibility with the sound output through the sound notification.

(8) Multiple types of waveform data, each having different content, are associated with one type of the sound identification information 52A. The control unit 45 selects the waveform data corresponding to a sound output event. This allows one unmanned ground vehicle 30 to output a sound of which the characteristic does not overlap the characteristic of another unmanned ground vehicle 30 and which corresponds to the environment of the one unmanned ground vehicle 30.

(9) In the above embodiment, the sound identification information 52A is allocated to a virtual speaker that produces a sound. This allows a person located near unmanned ground vehicles 30 to identify the unmanned ground vehicle 30 that outputs a sound to him as he discerns the difference between the voices of persons.

Second Embodiment

A second embodiment will now be described. In the following description, the same reference numerals are given to those components that are the same as the corresponding components of the above embodiment, and will not be described or will be described briefly.

In the second embodiment, in step S23 of the sound setting process, when setting the sound identification information of an approaching unmanned ground vehicle 30 that will approach the targeted unmanned ground vehicle 30 in a relatively short amount of time, the control unit 11 may set overlapping information for the targeted unmanned ground vehicle 30. The overlapping information indicates that the sound identification information of the targeted unmanned ground vehicle 30 may overlap that of the approaching unmanned ground vehicle 30. The overlapping information may include a period during which the overlapping of the sound identification information occurs.

When the overlapping information is set, the control unit 45 of an unmanned ground vehicle 30 outputs a sound that alerts a user to the traveling of the unmanned ground vehicle 30 based on the sound identification information during a period in which the overlapping of the sound identification information occurs, and controls the unmanned ground vehicle 30 not to output a sound that assists an operation for receiving a package.

In this manner, when setting, for the targeted unmanned ground vehicle 30, the same sound identification information as that of the approaching unmanned ground vehicle 30, the control unit 11 sets the targeted unmanned ground vehicle 30 to output a sound that alerts the user to the traveling of the targeted unmanned ground vehicle 30 with a higher priority than the sound that supports the operation for receiving the package.

Advantage of Second Embodiment

The advantage of the second embodiment will now be described.

(10) When setting, for the targeted unmanned ground vehicle 30, the same sound identification information as that of the approaching unmanned ground vehicle 30, the control unit 11 sets the targeted unmanned ground vehicle 30 to output a sound that alerts a user to the traveling of the targeted unmanned ground vehicle 30 with a higher priority than a sound that supports the operation for receiving the package. In this configuration, even when the same sound identification information is set for the targeted unmanned ground vehicle 30 and the approaching unmanned ground vehicle 30, a user located near the unmanned ground vehicles 30 readily hears a sound that alerts the user to the traveling of the targeted unmanned ground vehicle 30.

Third Embodiment

A third embodiment will now be described.
Sound Setting Process

As shown in FIG. 9, in the third embodiment, when determining that the unset sound identification information is not present (step S19: NO), the control unit 11 proceeds to step S25.

In step S25, the control unit 11 executes a route plan redetermination process. In this process, the control unit 11 redetermines the route plan for the targeted unmanned ground vehicle 30 to provide unset sound identification information. In particular, the control unit 11 may redetermine the route plan for the targeted unmanned ground vehicle 30 by changing a delivery sequence in the route plan for the targeted unmanned ground vehicle 30. When this process ends, the control unit 11 proceeds to step S12. Thus, in step S12, the control unit 11 acquires the route plan for the targeted unmanned ground vehicle 30 again.

In this manner, when determining that the targeted unmanned ground vehicle 30 will approach a different traveling unmanned ground vehicle 30, the control unit 11 acquires the route plan for the targeted unmanned ground vehicle 30 in a case in which sound identification information has been set for the different traveling unmanned ground vehicle 30.

Advantages of Third Embodiment

The advantage of the third embodiment will now be described.

(11) When determining that the targeted unmanned ground vehicle 30 will approach a different traveling unmanned ground vehicle 30, the control unit 11 acquires the route plan for the targeted unmanned ground vehicle 30 again even if the unset sound identification information is not present. In this configuration, even if the unset sound identification information is not present, the route plan is acquired again so that the unset sound identification information is more likely to be provided.

Modifications

The above embodiments may be modified as follows. The above embodiments and the following modifications can be combined as long as the combined modifications remain technically consistent with each other.

Delivery Notification Process

In the above embodiment, the control unit 11 executes a sound notification related to the delivery of a package to a delivery point when the unmanned ground vehicle 30 reaches the package delivery point. Instead, the control unit 11 executes a sound notification related to the delivery of a package to a delivery point when the time for the unmanned ground vehicle 30 to reach the package delivery point becomes a specified time. The specified time may be a time needed for the preparation of receiving a package (e.g., ten minutes).

In the above embodiment, the control unit 11 of the server 10 receives a sound notification related to the delivery of a package to a delivery point by communicating with the user device 20. Instead, the control unit 45 of the unmanned ground vehicle 30 may receive a sound notification related to the delivery of a package to a delivery point by communicating with the user device 20. In this case, the unmanned ground vehicle 30 may acquire a notification destination of the user device 20 from the server 10 before the unmanned ground vehicle 30 starts traveling, or may acquire the notification destination of the user device 20 from the server 10 after the unmanned ground vehicle 30 starts traveling.

Sound Selection Process

In the above embodiment, the control unit 11 selects the sound identification information 52A when a delivery request is issued before the unmanned ground vehicle 30 starts traveling. Instead, the control unit 11 may select the sound identification information 52A after the unmanned ground vehicle 30 starts traveling. In this case, the control unit 11 of the server 10 may set the sound identification information 52A by communicating with a traveling unmanned ground vehicle 30.

In the first and second embodiments, when the unset sound identification information is not present, the control unit 11 sets, for the targeted unmanned ground vehicle 30, the sound identification information of an approaching unmanned ground vehicle 30 that has a relatively short approach time. Instead, the control unit 11 may set the sound identification information for the targeted unmanned ground vehicle 30 based on an approach distance.

For example, the control unit 11 determines in the approach determination process whether approach occurs in a first approach range or in a second approach range that is greater than the first approach range. The first approach range may be a relatively short range (e.g., less than 10 meter). The second approach range may be a middle range (e.g., greater than or equal to 10 meter and less than or equal to 100 meters). The control unit 11 may set the sound identification information of the approaching unmanned ground vehicle 30 for the targeted unmanned ground vehicle 30, based on a first approach time during which approach occurs in the first approach range and a second approach time during which approach occurs in the second approach range. In this case, the control unit 11 may set the sound identification information of the approaching unmanned ground vehicle 30 for the targeted unmanned ground vehicle 30, based on a value obtained by giving a greater weight on the first approach time than on the second approach time through multiplication of the first approach time by a coefficient greater than 1. Thus, if an approaching unmanned ground vehicle 30 approaches in the first approach range and an approaching unmanned ground vehicle 30 approaches in the second approach range, the same sound identification information as that of an approaching unmanned ground vehicle 30 that approaches in the middle range may be set to the targeted unmanned ground vehicle 30. Instead, for example, regardless of the approach time, the control unit 11 may set the sound identification information for the targeted unmanned ground vehicle 30 based on an approach distance. Accordingly, when the unset sound identification information is not present, the control unit 11 may set, for the targeted unmanned ground vehicle 30, the sound identification information of one of other approaching unmanned ground vehicles 30 that has a relatively longer approach distance.

As another option, the control unit 11 may set the sound identification information for the targeted unmanned ground vehicle 30, based on whether the approach position of an approaching unmanned ground vehicle 30 includes a predetermined position. The predetermined position may be a position at which a sound output event is likely to occur. Specifically, the predetermined position may be a position that varies in the travel direction of an unmanned ground vehicle 30 (e.g., an intersection). Alternatively, the predetermined position may be a position (e.g., a delivery point) at which the unmanned ground vehicle 30 may stay for a relatively long time.

For example, if an approaching unmanned ground vehicle 30 approaches the targeted unmanned ground vehicle 30 at an intersection and an approaching unmanned ground vehicle 30 approaches the targeted unmanned ground vehicle 30 at a position other than an intersection, the control unit 11 sets the same sound identification information as that of the approaching unmanned ground vehicle 30 that approaches the targeted unmanned ground vehicle 30 at that position. Instead, for example, regardless of the approach time, the control unit 11 may set the sound identification information for the targeted unmanned ground vehicle 30 based on an approach position. Accordingly, when the unset sound identification information is not present, the control unit 11 may set, for the targeted unmanned ground vehicle 30, the sound identification information of an approaching unmanned ground vehicles 30 of which the approach position does not include a position at which an sound identification information occurs.

In the first and second embodiments, when the unset sound identification information is not present, the control unit 11 sets, for the targeted unmanned ground vehicle 30, the sound identification information of an approaching unmanned ground vehicle 30 that has a relatively short approach time. Instead, when the unset sound identification information is not present, the control unit 11 may cause the targeted unmanned ground vehicle 30 to wait until the unset sound identification information is generated.

In the third embodiment, when the unset sound identification information is not present before the unmanned ground vehicle 30 starts traveling, the control unit 11 acquires its route plan again. Instead, when multiple unmanned ground vehicles 30 for which the same sound identification information is set start traveling and then approach each other, the control unit 11 may acquire the route plan for the unmanned ground vehicle 30 again.

For example, when traveling unmanned ground vehicles 30 will approach each other, the control unit 11 may acquire the sound identification information of the approaching unmanned ground vehicles 30. When the approaching unmanned ground vehicles 30 have the same sound identification information, the control unit 11 acquires the route plan for at least one of the approaching unmanned ground vehicles 30 again. The control unit 11 sends the reacquired route plan to that approaching unmanned ground vehicle 30.

In the above embodiments, the control unit 11 sets, for the unmanned ground vehicle 30, the same sound identification information for one route plan. Instead, the control unit 11 may set, for the unmanned ground vehicle 30, multiple types of sound identification information for one route plan.

Specifically, when one route plan includes multiple delivery points, the control unit 11 may set sound identification information for each of the delivery points. For example, when one route plan includes a first delivery point and a second delivery point, the control unit 11 may set the sound identification information of the first delivery point to 1 and set the sound identification information of the second delivery point to 2. Thus, the control unit 45 of the unmanned ground vehicle 30 outputs a sound based on the sound identification information of 1 when traveling to the first delivery point, and outputs a sound based on the sound identification information of 2 when traveling to the second delivery point. In this case, the control unit 11 may issue a sound notification based on the sound identification information corresponding to each delivery point.

Output Control Process

In the above embodiment, the sound identification information 52A is allocated to each virtual speaker that produces a sound. The unmanned ground vehicle 30 outputs the sound of a message saying "I am turning left." based on the selected sound identification information 52A. Instead of, or in addition to this configuration, the sounds associated with the sound identification information 52A may be sounds that do not include verbal messages. Such sounds are, for example, beep sounds or warning sounds each having a different characteristic (e.g., frequency or tempo).

Unmanned Vehicle

Instead of, or in addition to delivering a package, the unmanned ground vehicle 30 may pick up a package.

The unmanned vehicle may be an unmanned aerial vehicle. The unmanned aerial vehicle is an aerial vehicle without a person onboard. In the same manner as the unmanned ground vehicle 30, the unmanned aerial vehicle includes a control device, a drive unit, a battery, and a HMI. The drive unit includes, for example, a drive source that is driven by electric power supplied from the battery and a rotary wing that is operated by power obtained from the drive source. In addition to a program for autonomous flying, the memory unit of the controller stores various types of information (e.g., map information and carrying plan information). When multiple unmanned aerial vehicles deliver packages in the same delivery area and approach each other, their alert sounds or their operation guidance sounds may overlap each other. Thus, if a process that outputs a sound in the same procedure as that of the above embodiments is executed, a person located nearby readily identifies the unmanned aerial vehicle that outputs a sound to that person.

Instead of traveling autonomously, one unmanned ground vehicle 30 may follow a leading vehicle (e.g., another unmanned ground vehicle 30). Unmanned ground vehicles 30 may be used for purposes other than delivery.

The unmanned ground vehicle 30 may be remotely operated by a manager terminal. The manager terminal is connected to the network 14.

The unmanned ground vehicle 30 may execute vehicle-to-vehicle communication. For example, the control unit 45 of an unmanned ground vehicle 30 may execute vehicle-to-vehicle communication with another unmanned ground vehicle 30 to determine whether there is an approaching unmanned ground vehicle 30. In this case, the control unit 45 may acquire sound identification information that has been set for the approaching unmanned ground vehicle 30. Then, if the same sound identification information as that of the approaching unmanned ground vehicle 30 has been set, the control unit 45 may issue a request for acquiring the route plan again to the server 10. If the same sound identification information as that of the approaching unmanned ground vehicle 30 has been set, the control unit 45 may issue a request for resetting the sound identification information to the server 10. Further, for example, if the same sound identification information as that of the approaching unmanned ground vehicle 30 has been set, the control unit 45 may change the setting of the sound identification information without making an inquiry to the server 10. Then, the control unit 45 may send the changed sound identification information to the server 10. In this case, for example, the control unit 11 may receive the changed sound identification information from the unmanned ground vehicle 30 and store that information in the delivery plan information 51.

Configuration of Logistics Management System

Instead of the unmanned ground vehicle 30, the server 10 may include the sound memory unit 49. For example, when the selection of the sound identification information 52A is completed, the unmanned ground vehicle 30 sends, to the server 10, a request for sending sound data. When receiving the request for sending the sound data, the server 10 sends the sound data to the unmanned ground vehicle 30.

In the above embodiment, the control unit 11 of the server 10 executes at least the route plan acquisition process, the approach determination process, and the sound setting process. Instead, the unmanned ground vehicle 30, a manager terminal, or another device connected to the network 14 may execute at least one of these processes. For example, in a case in which the server 10 executes some of the processes and the unmanned ground vehicle 30 executes the remaining processes, the server 10 and the unmanned ground vehicle 30 send and receive the results of the processes to and from each other if the results need to be shared. Further, the server 10 may include multiple devices. For example, the server 10 may include a PF server that provides a logistics management platform and a management server that generates an actual delivery plan based on the information acquired from the PF server.

Supplementary Claims

The technical ideas understood from the embodiments and modifications and their operational advantages will now be described below.

[Aspect 1] A logistics management server including:
a route plan acquisition unit that acquires route plans for unmanned vehicles each delivering a package to a delivery point, the unmanned vehicles including a first unmanned vehicle and a second unmanned vehicle;
n approach determination unit that determines whether the first unmanned vehicle and the second unmanned vehicle will approach each other based on the acquired route plan for the first unmanned vehicle and the acquired route plan for the second unmanned vehicle;
a sound setting unit capable of setting sound identification information such that a sound output from the first unmanned vehicle and a sound output from the second unmanned vehicle each have a different characteristic when the approach determination unit determines that the first unmanned vehicle and the second unmanned vehicle will approach each other.

[Aspect 2] The logistics management server according to aspect 1, where the sound setting unit may set sound identification information of the first unmanned vehicle before the first unmanned vehicle starts traveling.

[Aspect 3] The logistics management server according to aspect 1 or 2, where the logistics management server may include a delivery notification unit that issues a sound notification related to delivery of the package to the delivery point based on the sound identification information set by the sound setting unit.

[Aspect 4] The logistics management server according to any one of aspects 1 to 3, where the sound setting unit may set the sound identification information in accordance with a predetermined priority.

[Aspect 5] The logistics management server according to any one of aspects 1 to 4, where
when the approach determination unit determines that the first unmanned vehicle and the second unmanned vehicle will approach each other, the sound setting unit may:
set standard sound identification information for the first unmanned vehicle in a case in which the standard sound identification information has not been set for the second unmanned vehicle.

[Aspect 6] The logistics management server according to any one of aspects 1 to 5, where
when the approach determination unit determines that the first unmanned vehicle and the second unmanned vehicle will approach each other, the sound setting unit may:
set, for the first unmanned vehicle, sound identification information that is different from the standard sound identification information in a case in which the standard sound identification information has been set for the second unmanned vehicle.

[Aspect 7] The logistics management server according to any one of aspects 1 to 6, where
when the approach determination unit determines that the first unmanned vehicle and the other unmanned vehicle will approach each other, the sound setting unit may:
set, for the first unmanned vehicle, sound identification information that has not been set for another unmanned vehicle in a case in which the sound identification information that has not been set for the other unmanned vehicle is present.

[Aspect 8] The logistics management server according to any one of aspects 1 to 7, where
when the approach determination unit determines that the first unmanned vehicle will approach the other unmanned vehicles, the sound setting unit may:
in a case in which all types of sound identification information have been set for the other unmanned vehicles, set, for the first unmanned vehicle, the sound identification information that has been set for one of other unmanned vehicles that approaches the first unmanned vehicle in a relatively short amount of time.

[Aspect 9] The logistics management server according to aspect 8, where
in a case in which the sound setting unit sets, for the first unmanned vehicle, the same sound identification information as sound identification information of one of the other unmanned vehicles, the sound setting unit may:
set the first unmanned vehicle to output a sound that alerts a user to traveling of the first unmanned vehicle with a higher priority than a sound that supports an operation for receiving the package.

[Aspect 10] The logistics management server according to any one of aspects 1 to 9, where
when the approach determination unit determines that the first unmanned vehicle and the other unmanned vehicle will approach each other, the route plan acquisition unit may:
acquire the route plan for the first unmanned vehicle again in a case in which sound identification information has been set for another unmanned vehicle.

[Aspect 11] The logistics management server according to any one of aspects 1 to 10, where
when the approach determination unit determines that the first unmanned vehicle will approach the other unmanned vehicles, the sound setting unit may:
in a case in which all types of sound identification information have been set for the other unmanned vehicles, set, for the first unmanned vehicle, the sound identification information that has been set for one of other unmanned vehicles that approaches the first unmanned vehicle in a relatively long distance.

[Aspect 12] The logistics management server according to any one of aspects 1 to 11, where
when the approach determination unit determines that the first unmanned vehicle will approach the other unmanned vehicles, the sound setting unit may:
in a case in which all types of sound identification information have been set for the other unmanned vehicles, set, for the first unmanned vehicle, the sound identification information that has been set for one of other unmanned vehicles that approaches the first unmanned vehicle at a position that does not include a predetermined position.

[Aspect 13] The logistics management server according to aspect 12, where the predetermined position may be a position at which a sound output event occurs.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An unmanned vehicle management server comprising:
at least one memory storing computer program code; and
at least one processor configured to execute the computer program code and to cause the unmanned vehicle management server to operate according to the computer program code, wherein the computer program code comprises:
route acquisition code configured to cause at least one of the at least one processor to acquire a first route plan for a first unmanned vehicle and a second route plan for a second unmanned vehicle;
approach identification code configured to cause at least one of the at least one processor to identify whether the first and the second unmanned vehicles will approach within a predetermined distance of one another based on the first and the second route plans;
sound setting code configured to cause at least one of the at least one processor to, based on identifying that the first unmanned vehicle and the second unmanned vehicle will approach within the predetermined distance of one another, set sound identification information of the first unmanned vehicle such that a sound output from the first unmanned vehicle is based on the sound identification information and is audibly distinguishable from a sound output from the second unmanned vehicle to an observer in auditory range of each of the first and the second unmanned vehicles; and
notification code configured to cause at least one of the at least one processor to control the first unmanned vehicle to, based on arrival of the first unmanned vehicle at a destination, output a sound notification based on the sound identification information of the first unmanned vehicle while the second unmanned vehicle is within the predetermined distance of the first unmanned vehicle.

2. The unmanned vehicle management server of claim 1, wherein the sound setting code is further configured to cause at least one of the at least one processor to set the sound identification information of the first unmanned vehicle before the first unmanned vehicle starts traveling.

3. The unmanned vehicle management server of claim 1, wherein the sound setting code is further configured to set the sound identification information in accordance with a predetermined priority.

4. The unmanned vehicle management server of claim 1, wherein the sound setting code is further configured to set the sound identification information of the first unmanned vehicle to standard sound identification information based on identifying that sound identification information of the second unmanned vehicle is not the standard sound identification information.

5. The unmanned vehicle management server of claim 4, wherein the sound setting code is further configured to set the sound identification information of the first unmanned vehicle to sound identification information that is different from the standard sound identification information based on identifying that the standard sound identification information of the second unmanned vehicle has been set to the standard sound identification information.

6. The unmanned vehicle management server of claim 1,
wherein the first and the second unmanned vehicles are included in a plurality of unmanned vehicles,
wherein the route acquisition code is further configured to cause at least one of the at least one processor to acquire a plurality of route plans corresponding to each of the plurality of unmanned vehicles,
wherein the approach identification code is further configured to cause at least one of the at least one processor to identify whether the first unmanned vehicle will approach within the predetermined distance of one or more of the plurality of unmanned vehicles based on the plurality of route plans, and
wherein the sound setting code is further configured to cause at least one of the at least one processor to, based on identifying that the first unmanned vehicle will approach within the predetermined distance of one or more of the plurality of unmanned vehicles, set the sound identification information of the first unmanned vehicle to be different from sound identification information of the identified one or more of the plurality of unmanned vehicles.

7. The unmanned vehicle management server of claim 1,
wherein the first and the second unmanned vehicles are included in a plurality of unmanned vehicles,
wherein the route acquisition code is further configured to cause at least one of the at least one processor to acquire a plurality of route plans corresponding to each of the plurality of unmanned vehicles,
wherein the approach identification code is further configured to cause at least one of the at least one processor to identify whether the first unmanned vehicle will approach within the predetermined distance of one or more of the plurality of unmanned vehicles based on the plurality of route plans, and
wherein the sound setting code is further configured to cause at least one of the at least one processor to, based on identifying that the first unmanned vehicle will approach within the predetermined distance of one or more of the plurality of unmanned vehicles and further based on identifying that all available types of sound identification information have been set for the identified one or more of the plurality of unmanned vehicles:
identify, based on the plurality of route plans, an approaching unmanned vehicle that will approach the first unmanned vehicle within a predetermined period of time from among the identified one or more of the plurality of unmanned vehicles, and
set the sound identification information of the first unmanned vehicle to be the same as sound identification information of the identified approaching unmanned vehicle.

8. The unmanned vehicle management server of claim 7, wherein the sound setting code is further configured to cause at least one of the at least one processor to, based on setting the sound identification information of the first unmanned vehicle to be the same as the sound identification information of the identified approaching unmanned vehicle, control the first unmanned vehicle to output a sound that alerts a user to traveling of the first unmanned vehicle with a higher priority than a sound that supports an operation related to receiving a package.

9. The unmanned vehicle management server of claim 1, wherein the first and the second unmanned vehicles are included in a plurality of unmanned vehicles,
wherein the route acquisition code is further configured to cause at least one of the at least one processor to acquire a plurality of route plans corresponding to each of the plurality of unmanned vehicles,
wherein the approach identification code is further configured to cause at least one of the at least one processor to identify whether the first unmanned vehicle will approach within the predetermined distance of one or more of the plurality of unmanned vehicles based on the plurality of route plans, and
wherein the route acquisition code is further configured to cause at least one of the at least one processor to, based on identifying that the first unmanned vehicle will approach within the predetermined distance of one or more of the plurality of unmanned vehicles and further based on identifying that all available types of sound identification information have been set for the identified one or more of the plurality of unmanned vehicles, reacquire the first route plan.

10. A method of managing an unmanned vehicle management system, the method comprising:
acquiring a first route plan for a first unmanned vehicle and a second route plan for a second unmanned vehicle;
identifying whether the first and the second unmanned vehicles will approach within a predetermined distance of one another based on the first and the second route plans;
based on identifying that the first unmanned vehicle and the second unmanned vehicle will approach within the predetermined distance of one another, setting sound identification information of the first unmanned vehicle such that a sound output from the first unmanned vehicle is based on the sound identification information and is audibly distinguishable from a sound output from the second unmanned vehicle to an observer in auditory range of each of the first and the second unmanned vehicles; and
based on the first unmanned vehicle arriving at a destination controlling the first unmanned vehicle to output a sound notification based on the sound identification information of the first unmanned vehicle while the second unmanned vehicle is within the predetermined distance of the first unmanned vehicle.

11. An unmanned vehicle management system comprising:
a first unmanned vehicle;
a second unmanned vehicle; and
an unmanned vehicle management server in communication with the first and the second unmanned vehicles,
wherein the unmanned vehicle management server comprises: at least one memory storing computer program code; and at least one processor configured to execute the computer program code and to cause the unmanned vehicle management server to operate according to the computer program code, wherein the computer program code comprises:
route acquisition code configured to cause at least one of the at least one processor to acquire a first route plan for the first unmanned vehicle and a second route plan for the second unmanned vehicle;
approach identification code configured to cause at least one of the at least one processor to identify whether the first and the second unmanned vehicles will approach within a predetermined distance of one another based on the first and the second route plans; and
sound setting code configured to cause at least one of the at least one processor to, based on identifying that the first unmanned vehicle and the second unmanned vehicle will approach within the predetermined distance of one another, set sound identification information of the first unmanned vehicle such that a sound output from the first unmanned vehicle is based on the sound identification information and is audibly distinguishable from a sound output from the second unmanned vehicle to an observer in auditory range of each of the first and the second unmanned vehicles, and
wherein the first unmanned vehicle comprises:
at least one vehicle memory storing vehicle computer program code; and
at least one vehicle processor configured to execute the vehicle computer program code and to cause the first unmanned vehicle to operate according to the vehicle computer program code, wherein the vehicle computer program code comprises notification code configured to cause at least one of the at least one vehicle processor to control the first unmanned vehicle to, based on arrival of the first unmanned vehicle at a destination, output a sound notification based on the sound identification information of the first unmanned vehicle while the second unmanned vehicle is within the predetermined distance of the first unmanned vehicle.

* * * * *